(No Model.) 2 Sheets—Sheet 1.
B. HEWITT & R. WOOTTON.
MACHINE FOR MAKING SHELLS, TUBES, &c.
No. 516,809. Patented Mar. 20, 1894.
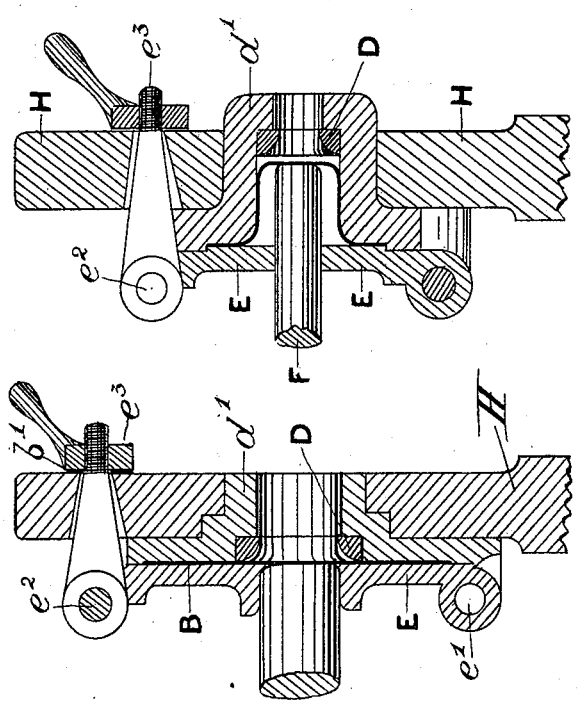

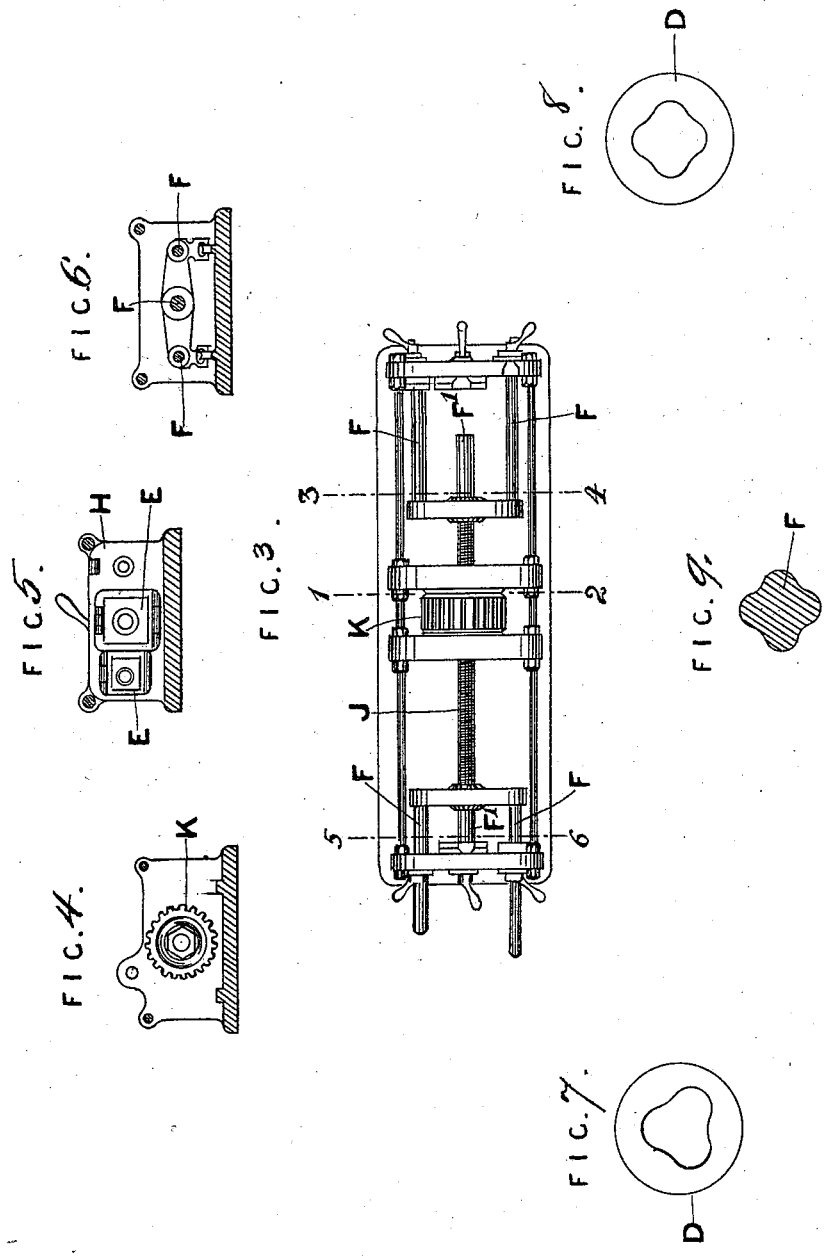

UNITED STATES PATENT OFFICE.

BENJAMIN HEWITT AND ROBERT WOOTTON, OF BIRMINGHAM, ENGLAND.

MACHINE FOR MAKING SHELLS, TUBES, &c.

SPECIFICATION forming part of Letters Patent No. 516,809, dated March 20, 1894.

Application filed May 27, 1893. Serial No. 475,730. (No model.) Patented in England January 20, 1893, No. 1,270.

*To all whom it may concern:*

Be it known that we, BENJAMIN HEWITT, of 72 Wiggin Street, Icknield Port Road, and ROBERT WOOTTON, managing director of the British Seamless Steel Tube Company, Limited, of Smethwick, Birmingham, in the county of Warwick, England, subjects of the Queen of Great Britain, have invented certain new and useful Improvements in Machines for Making Shells, Vessels, and Tubes, (for which we have obtained a patent in England No. 1,270, dated January 20, 1893,) of which the following is a specification.

Our invention has for its object improvements in machinery for the manufacture of shells, vessels, and tubes by which such articles can be made much more expeditiously than hitherto while the machinery is exceedingly simple in operation and special facilities are rendered for the easy insertion of blanks and the removal of the finished articles.

In carrying our invention into effect we may mount two, three or any number of horizontal mandrels or rams so as to have a reciprocating motion say two at each end so that as two are retreating two are advancing. At each end of the bed a vertical head is fixed through which the heads of the mandrels pass thus rendering the mandrel ends perfectly steady and rigid. We mount the die boxes so as to also form pressure plates and between the die boxes and the head the blanks are placed the two being lightly clamped together so that as the blank is forced through the die by the mandrel it is made to form a sleeve on the mandrel or ram. The four mandrels may be made to effect four stages in the manufacture as for example the blank may first be forced through a trefoil, quarterfoil, or other shaped die to bring it into the vessel shape after which it would be forced through each of the other dies until the longest required shell was obtained while four separate articles would be in course of manufacture at the same time. By pivoting or hinging the combined die holder and pressure plate the articles can readily be bumped out of the die, while the said die and pressure plate retain the shells or vessels in position while the mandrels are being withdrawn which is of great importance as the metal cannot be drawn back with the mandrel. Instead of shaping the die for the first process we may find it preferable to shape the mandrel, as by either means we control and distribute the crumping of the metal so that the articles when finished will be perfectly regular in gage.

We may use any power or means to obtain the reciprocation of the mandrels and for securing the die box and pressure plate to the head while the mandrels are in operation. A recess is formed in the back of the pressure plate to receive the blank so that the blank can be inserted in a perfectly true position with rapidity and ease.

In order that our invention may be clearly understood and more easily carried into practice we have appended hereunto two sheets of drawings upon which we have fully illustrated the nature of our said improvements.

Figure 1. is a vertical section showing the arrangements of die and pressure plate for effecting the first operation. Fig. 2. is a similar section giving an example of the arrangement for effecting a later operation. Fig. 3. is a plan showing an example of the mode of mounting the mandrels and dies. Fig. 4. is a cross section on the line 1—2. of Fig. 3. Fig. 5. is a cross section on the line 3—4. of Fig. 3. Fig. 6. is a cross section on the line 5—6. of Fig. 3. Fig. 7. is a cross-section of the form of die we may use in the earlier processes. Fig. 8. is a similar elevation to Fig. 7 showing a modification in the form of die. Fig. 9. is a section through the mandrel or ram F.

In carrying our invention into effect we mount the die holder $d'$ containing the die D in the head H to which die holder the pressure plate E is hinged at $e'$ and is provided with the hinged clamp $e^2$ by which the blank B is clamped between the die holder and pressure plate by means of the hand screw $e^3$, a dummy blank $b'$ slightly thicker than the blank B being placed between the hand screw $e^3$ and the head H for the purpose of regulating the pressure upon the blank B. The mandrel or ram F travels forward and forces the blank B through the die D thus causing the blank B to form a shell or sleeve upon the ram F to the extent of its travel, the pressure plate E being so arranged as to turn down upon the hinge e' for the insertion of the blank B and the removal of the shell or sleeve. The die holder d' and pressure plate E are attached together, complete in themselves, and separable from the head, whereby the whole may be readily removed from the head H for the purpose of inserting varied sizes of dies in the same machine. In the later process or processes the arrangement is similar except in the case of the die holder $d^2$ which is so shaped as to receive the shell or sleeve B for the operation of the ram F which forces it through the die D until it forms a sleeve upon the ram or mandrels F.

In mounting the dies and mandrels upon the machine we may arrange them in any suitable manner.

We do not, however, confine ourselves to the use of any number of mandrels or to their reciprocating action or to the mode of operating the same as we may arrange them in any convenient position or positions, but in the case illustrated in Fig. 3 we may start to operate the blanks by the central rams F' finishing them by the side rams F at each end.

In the first action or actions we may use a die of trefoil, quarterfoil or other similar shape as shown by Figs. 7 and 8 which would assist in the equal distribution of the metal when the shells were being forced, or the ram F may be similarly shaped while the die is round or of corresponding shape.

We do not confine ourselves to one crimped or corrugated die or ram as we may use several to make the process more gradual.

We may use any suitable power or means for operating the mandrels, Fig. 3 only showing an example in which the cog K operates the screw rod J the reversing being effected by any of the well-known reversing arrangements.

What we claim, then, is—

In machinery for the manufacture of shells, vessels, and tubes, the combination of a die holder and die contained therein with a pressure plate hinged to the said die-holder, a support for the aforesaid parts, and means for clamping the said pressure plate to the said support, the said plate and holder being removable together at will, substantially as set forth.

In testimony that we claim the foregoing as our own we affix our names in the presence of two witnesses.

BENJAMIN HEWITT.
    ROBERT WOOTTON.

Witnesses:
 LEWIS WM. GOOLD,
 GEORGE WATHEN.